Patented May 25, 1948

2,442,053

UNITED STATES PATENT OFFICE 2,442,053

DIALKYLATED SILICON ESTERS AND METHOD OF MAKING THEM

Rob Roy McGregor, Verona, and Earl Leathen Warrick, Pittsburgh, Pa., assignors to Corning Glass Works, Corning, N. Y., a corporation of New York No Drawing. Application June 6, 1945, Serial No. 597,950

4 Claims. (Cl. 260—448.8)

This invention relates to the alkylation of silicon compounds, particularly the silicon esters such as ethyl orthosilicate —$Si(OC_2H_5)_4$.

This application is a continuation-in-part of our copending application Serial Number 416,-285 filed October 23, 1941 since matured into U. S. Patent No. 2,380,057, dated July 10, 1945, and assigned to the assignee of the present invention.

In an article published in the Journal General Chemistry U. S. S. R., 8, No. 6, 558–62 (1938) the authors, Andrianov and Gribanova, describe the preparation of monoalkyltriethoxysilanes by reacting metallic magnesium, alkyl halide and ethyl orthosilicate in the absence of ether. It is stated in this article that while the monoalkyltriethoxysilane can be obtained in fair yields, it is difficult to obtain dialkyldiethoxysilanes by this method. Specifically, the mono-isopropyl and mono-isoamyltriethoxysilanes were described as being prepared but the corresponding disubstituted silanes were not obtained.

We have discovered that dialkyldiethoxysilanes can be made in substantial yields by reacting magnesium, alkyl halide and ethyl orthosilicate in the absence of ether provided the alkyl radical of the halide is a normal alkyl radical having from 3 to 5 carbon atoms.

An object of this invention is to produce dialkylated silicon esters in a simple and economical manner.

Another object is to alkylate a silicon ester in the absence of ether or other solvent.

To these and other ends the invention comprises reacting a halide of a normal alkyl radical having from 3 to 5 carbon atoms with a mixture of metallic magnesium and ethyl orthosilicate in the absence of ether and other solvents.

We have discovered that ethyl orthosilicate can be dialkylated by means of a nascent magnesium alkyl Grignard reagent in the absence of ether when the alkyl radical of the Grignard reagent is selected from the class consisting of n-propyl, n-butyl, and n-amyl radicals. In other words, disubstitution occurs when the Grignard reagent, instead of being prepared separately in an ether solution before mixing it with ethyl orthosilicate, is formed in situ in contact with the ethyl orthosilicate and in the absence of ether. The useful alkylated fractions of the reaction products can be separated from the residual magnesium salts by direct fractional distillation, thereby affording a better yield than the conventional method and avoiding the additional step of extraction with a solvent.

In the preparation of many magnesium Grignard reagents not all of the magnesium is reacted, probably because it becomes coated with salts and other by-products. Hence a 100% yield of the reagent based on the amount of magnesium employed cannot always be expected. The same holds true with our process wherein the Grignard reagent is formed in situ. However, when equimolecular quantities of the alkyl halide, the silicon orthoester and magnesium are used we have obtained products which contain about two-thirds as much of the dialkylated ester as they do of the mono-alkylated ester. Based on the results of our experiments the reaction is believed to proceed according to the following general equation which does not take into account the possible formation of small amounts of the trialkylated ester and complex derivatives:

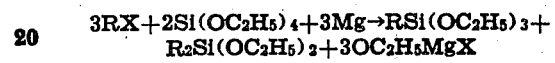

R is a normal alkyl radical having from three to five carbon atoms and X is a halogen.

The reaction of metallic magnesium with an alkyl chloride does not start as readily as with an alkyl bromide and when the chloride is employed it is usually necessary to initiate the reaction by the addition of a small amount of a starting catalyst such as ethyl bromide preferably in conjunction with iodine after which the reaction with the chloride proceeds readily.

For a better understanding of our invention reference should be had to the following example which is included by way of illustration and not limitation.

Example

Two thousand and eighty (2080) grams of ethyl silicate were added to three hundred and sixty (360) grams of magnesium and thirteen hundred and eighty-seven grams of n-butyl chloride. The resulting mixture was placed in a pressure-tight reaction vessel and stirred. The pressure rose to 60 lbs. in 40 minutes. Stirring was continued for 3½ hours. Distillation at atmospheric pressure (760 mm.) of the product yielded 215 grams of liquid boiling between 192° and 193° C., and 595 grams boiling at 220° C. Analysis established the first fraction to be mono-n-butyltriethoxysilane and the second fraction to be di-n-butyldiethoxysilane. Corresponding yields of mono- and di-n-butylethoxysilanes were likewise obtained when the above reaction was carried out in a vessel equipped with an adequate condenser instead of a pressure-tight vessel.

In a similar manner, di-n-propyldiethoxysilane and di-n-amyldiethoxysilane were prepared from n-propyl chloride and n-amyl chloride, respectively.

The silanes produced by the method set forth in the above examples are useful either to render siliceous surfaces water-repellant or as intermediates in the preparation of siloxane polymers. The latter are produced upon hydrolysis and condensation of the silanes.

We claim:

1. The method of making a dialkyldiethoxysilane which comprises reacting an alkyl halide with metallic magnesium and ethyl orthosilicate in the absence of solvent, the alkyl substituent of said alkyl halide being selected from the class consisting of n-propyl, n-butyl and n-amyl radicals, and allowing the reaction to continue until a substantial quantity of the dialkyldiethoxysilane is obtained.

2. The method of making a dialkyldiethoxysilane which comprises reacting an alkyl chloride with metallic magnesium and ethyl orthosilicate in the absence of solvent, the alkyl substituent of said alkyl halide being selected from the class consisting of n-propyl, n-butyl, and n-amyl radicals, fractionally distilling the reactions products, and recovering therefrom the dialkyldiethoxysilane.

3. The method of making di-n-butyldiethoxysilane which comprises reacting n-butyl halide with metallic magnesium and ethyl orthosilicate in the absence of solvent, fractionally distilling the reaction product, and recovering therefrom di-n-butyldiethoxysilane.

4. The method of making di-n-butyldiethoxysilane which comprises reacting n-butyl chloride with metallic magnesium and ethyl orthosilicate in the absence of solvent, fractionally distilling the reaction product, and recovering therefrom di-n-butyldiethoxysilane.

ROB ROY McGREGOR.
EARL LEATHEN WARRICK.

REFERENCES CITED

The following references are of record in the file of this patent:

Andrianov et al.: Jour. Gen. Chem., USSR, 8 (No. 6), pages 558–62 (1938).